(12) United States Patent
Herrmann et al.

(10) Patent No.: US 11,034,288 B2
(45) Date of Patent: Jun. 15, 2021

(54) MOVEABLE ILLUMINATION AND IMAGE ACQUISITION UNIT FOR A MOTOR VEHICLE

(71) Applicant: SMR Patents S.à.r.l., Luxembourg (LU)

(72) Inventors: Andreas Herrmann, Stuttgart (DE); Stefanie Göttlicher, Bruchköbel (DE); Alf Liesener, Bruchköbel (DE)

(73) Assignee: SMR Patents S,á. r.l., Luxembourg (LU)

( * ) Notice: Subject to any disclaimer, the term of this patent is extended or adjusted under 35 U.S.C. 154(b) by 0 days.

(21) Appl. No.: 16/611,709

(22) PCT Filed: May 7, 2018

(86) PCT No.: PCT/EP2018/061680
§ 371 (c)(1),
(2) Date: Nov. 7, 2019

(87) PCT Pub. No.: WO2018/206484
PCT Pub. Date: Nov. 15, 2018

(65) Prior Publication Data
US 2020/0290505 A1   Sep. 17, 2020

(30) Foreign Application Priority Data

May 8, 2017   (DE) .................... 10 2017 109 872.0
Jul. 27, 2017   (DE) .................... 10 2017 117 024.3

(51) Int. Cl.
*B60Q 1/26* (2006.01)
*B60Q 1/00* (2006.01)
*B60R 11/00* (2006.01)

(52) U.S. Cl.
CPC ......... *B60Q 1/2657* (2013.01); *B60Q 1/0023* (2013.01); *B60Q 1/2619* (2013.01);
(Continued)

(58) Field of Classification Search
CPC .. B60Q 1/2642; B60Q 1/2657; B60Q 1/2692; B60R 2300/8046
See application file for complete search history.

(56) References Cited

U.S. PATENT DOCUMENTS 4,815,757 A *  3/1989  Hamilton ................ B60R 11/04
                                                          182/69.4
8,305,443 B2 * 11/2012  Buschmann ............ B60R 11/04
                                                          348/148
(Continued)

FOREIGN PATENT DOCUMENTS

DE         20319579 U1    6/2005
DE       102016200183 A1  7/2016
DE       102015113725 A1  2/2017

OTHER PUBLICATIONS

International Search Report dated Jul. 18, 2018 of International application No. PCT/EP2018/061680.
(Continued)

*Primary Examiner* — Evan P Dzierzynski
*Assistant Examiner* — Keith G. Delahoussaye
(74) *Attorney, Agent, or Firm* — Jones Day

(57) ABSTRACT

An illumination and image acquisition unit for movable mounting on a vehicle body includes a movable section having an image acquisition section with at least one camera, a lighting member having at least one light source and an end section, the at least one light source being a component of a side boundary light, an ambient lighting, a signal or warning light, a flasher, a camper light, a laser display, a logo lamp, a floor light, or a projector. A motor vehicle includes such a lighting and imaging unit.

18 Claims, 6 Drawing Sheets

(52) U.S. Cl.
CPC ............... *B60R 2011/0084* (2013.01); *B60R 2300/8046* (2013.01)

(56) References Cited

U.S. PATENT DOCUMENTS

| | | | | |
|---|---|---|---|---|
| 8,864,392 | B2* | 10/2014 | Alexander | B60S 1/56 |
| | | | | 396/448 |
| 9,403,491 | B2* | 8/2016 | Happy | H04N 5/23293 |
| 9,718,414 | B2* | 8/2017 | Da Deppo | B60R 11/04 |
| 9,834,154 | B2* | 12/2017 | Carson | B60R 11/04 |
| 9,843,734 | B2* | 12/2017 | DiMenichi | H04N 5/23293 |
| 9,919,748 | B2* | 3/2018 | Williams | B60R 11/04 |
| 9,975,472 | B2* | 5/2018 | Wadell | B60Q 3/80 |
| 10,214,139 | B1* | 2/2019 | Warner | B60Q 1/0035 |
| 10,569,720 | B2* | 2/2020 | Buschmann | H04N 5/2253 |
| 10,618,464 | B2* | 4/2020 | Squicciarini | B60Q 1/2611 |
| 10,621,445 | B2* | 4/2020 | Higgins | G06K 9/00791 |
| 10,703,301 | B2* | 7/2020 | Hartland | B60J 5/107 |
| 2009/0231430 | A1* | 9/2009 | Buschmann | B60R 11/04 |
| | | | | 348/148 |
| 2009/0309971 | A1* | 12/2009 | Schuetz | B60R 11/04 |
| | | | | 348/148 |
| 2013/0209079 | A1* | 8/2013 | Alexander | B60R 11/04 |
| | | | | 396/25 |
| 2016/0065796 | A1* | 3/2016 | Happy | B60R 1/002 |
| | | | | 348/376 |
| 2016/0318438 | A1* | 11/2016 | Wadell | B60Q 1/2603 |
| 2017/0001578 | A1* | 1/2017 | Buschmann | H04N 5/2254 |
| 2017/0136963 | A1* | 5/2017 | Carson | H04N 5/2252 |
| 2017/0210284 | A1* | 7/2017 | Donan | B60Q 1/503 |
| 2017/0369106 | A1* | 12/2017 | Williams | G01S 7/4813 |
| 2018/0001820 | A1* | 1/2018 | Higgins | B62D 33/0273 |
| 2018/0281672 | A1* | 10/2018 | Squicciarini | F21S 41/192 |
| 2019/0118728 | A1* | 4/2019 | Oba | H04N 5/247 |
| 2019/0118729 | A1* | 4/2019 | Hartland | B60J 5/107 |

OTHER PUBLICATIONS

Written Opinion dated Jul. 18, 2018 of International application No. PCT/EP2018/061680.

* cited by examiner

MOVEABLE ILLUMINATION AND IMAGE ACQUISITION UNIT FOR A MOTOR VEHICLE

CROSS-REFERENCE TO RELATED APPLICATIONS

This application is a National Stage Entry of International Patent Application No. PCT/EP2018/061680, filed May 7, 2018, which claims the benefit of priority to German Patent Application No. DE 10 2017 117 024.3, filed Jul. 27, 2017, and German Patent Application No. DE 10 2017 109 872.0, filed May 8, 2017, each of which is hereby incorporated by reference in its entirety for all purposes.

BACKGROUND

1. Field of the Invention

The present disclosure relates to a movable illumination and image acquisition unit for a motor vehicle.

2. Related Art

In modern motor vehicles, exterior rear-view mirrors are increasingly to be supplemented or completely replaced by camera arrangements. As known from exterior rearview mirrors, it is desirable to move such camera arrangements to a rest position when not in use, for example when parking a vehicle, in order to avoid damage in particular. Since a pure camera arrangement, also known as a camera pod, can generally be designed more compactly than an exterior rear-view mirror, it is preferable if the camera arrangement in the rest position is completely stowed inside the vehicle fairing, i.e. the rest position represents a stow position.

A rear-view device for a motor vehicle provides an image of the rear of the motor vehicle which is at least in conformity with the legal requirements and belongs to a subset of devices for indirect vision. These provide images and views of objects that are not within the driver's direct field of view, i.e. in opposite directions, left, right, below and/or above the driver's line of vision. The driver's view, in particular in the line of vision, may not be entirely satisfactory, for example line-of-sight obstructions may be caused by parts of the vehicle body, in particular the A-pillar, the roof structure and/or the cowl, and line-of-sight obstructions may be caused by other vehicles and/or objects outside the vehicle which may obstruct the vision to such an extent that the driver is not able to fully satisfy a driving situation or can only partially perceive it. It is also possible that the driver is not able to see the situation in or off the line of vision in the way that would be necessary to control the vehicle according to the situation. Therefore, a rear view device may also be designed to prepare the information according to the skills of the driver in order to enable him to obtain the best possible assessment of the situation.

Various functions and devices can be built into and/or controlled by retrospect devices, including in particular cameras. Particularly useful are functions and devices for improving, extending and/or maintaining the functionality of the rear view device under normal or extreme conditions. In this, heating and/or cooling devices, cleaning means such as wipers, liquid and/or gaseous sprays, actuator means for moving the rear view device or parts thereof, such as a display, a camera system and/or parts of a camera system comprising for example lenses, filters, light sources, adaptive optics such as deformable mirrors, sensors and/or mirrors, and/or actuator means for inducing movements of other objects, for example parts of the vehicle and/or objects surrounding the vehicle.

Furthermore, the rear view device may comprise linear guides and/or rotating wheels, such as a filter wheel, for exchanging optical elements, such as lenses, mirrors, light sources, sensors, adaptive optics such as deformable mirrors and/or filters.

Other devices may be integrated in rear view devices and/or other devices may be controlled by means of rear view devices, such as any type of lighting module comprising an external lighting module, an internal lighting module, a front light, a rear light, a fog lamp, a stop light, an accelerating light, a flashing light, a logo light, an apron light, a ground light, a puddle light, a flashlight, a navigation light, a position light, an emergency light, a headlight, a green light, a red light, a warning light, a flashing light light module, a proximity light, a search light, an information light, a display and/or the like. Other examples of functions and devices integrated into and/or controlled by rear view devices may include a fatigue detection system, a microsleep detection system, a distance and/or speed determination system, such as a LIDAR (light detection and ranging) system, a blind spot indication system, a lane change assistance system, a navigation assistance system, a tracking assistance system, a human-machine interaction system, a machine-machine interaction system, an emergency and precautionary assistance system, such as an accident prevention assistance system, a countermeasure assistance system, a brake assistance system, a steering assistance system, an acceleration assistance system, an escape assistance system comprising, for example, an ejection seat system, a direction indicator, a blind spot indicator, a proximity system, an emergency braking system, a charging status indicator, a vehicle mode system comprising, for example, a sports mode system, an economy mode system, comprising an autonomous driving mode system, a sleep mode system and/or an anti-theft system, a vehicle locked indication system, a vehicle stolen indication, a warning signal system, a temperature indicator system, a weather indication system, a traffic light signal system, a fuel status system and/or any combination thereof.

Lighting devices for rear view devices and/or light guides for this purpose are described in the German patent application No. 102012108488, in the German patent application No. 102012104529, in the German patent application No. 102012107833, in the German patent application No. 102012107834, in the European patent No. 2738043, in the European patent No. 2947378, in the international patent application No. 2015/173695, in the European patent application No. 3045944, in the U.S. patent application Ser. No. 15/228,566, in the U.S. patent application Ser. No. 15/000,733, in the international patent application No. 2016/147154, in the U.S. patent application Ser. No. 15/256,532, in the German patent application No. 102015115555, in the European patent application No. 3144183, of the applicant.

In particular, a camera module can have a large number of different optical elements, including a large number of different sensors and light sources, as well as housing parts. The housing of a camera module may be made of plastic, metal, glass, other suitable material, and/or any combination thereof, and may be used in combination with the techniques described below to change or modify the properties of the material or material surface. Housings, for example, are disclosed in the German patent application No. 102016108247.3.

For example, the camera may include CCD or CMOS or light field sensors as described in German Patent Application No. 102011053999 and U.S. Pat. No. 6,703,925. Also, an area of the sensor can be reserved for various purposes, for example to detect a test beam, as disclosed in U.S. Pat. No. 8,031,224.

The optical elements may be formed or shaped from any type of glass or other suitable material. Glass is used here in the sense of a non-crystalline amorphous solid which shows a glass transition when heated towards the liquid state. It includes, for example, the group of polymer glasses, metal glasses, silicon dioxide glasses, but also any other suitable material that shows the glass transition can also be used. The glass can be either flat, wedge-shaped, rectangular, cylindrical, spherical, conical, elliptical and/or circular, as described for example in the German patent application No. 102016108247.3 and the German patent application No. 102011103200, or have a shape according to the different needs or lens types. As non-restrictive examples, camera modules can be equipped with lenses, such as a wide-angle or fisheye lens, which is capable of providing peripheral images, as in U.S. patent application Ser. No. 15/281,780 and U.S. patent application Ser. No. 13/090,127, a Fresnel lens or microlenses as described in German patent application No. 102011053999, or a TIR (total internal reflection lens) as described in U.S. Pat. No. 8,740,427. Another type of optical element known to be used in camera modules are optical fibres, in particular in the form of fibre bundles and preferably in the form of fibre bundles with an optical head, as described for example in U.S. patent application Ser. No. 09/771,140. Various methods can be used to produce such optical elements, such as the method described in U.S. Pat. No. 8,460,060. The optical elements may be transparent as described for example in U.S. Pat. No. 8,031,224, German Patent Application No. 102016108247.3 and US patent application Ser. No. 13/242,829. But the optical elements can also be semitransparent, as described in U.S. patent application Ser. No. 09/771,140 and U.S. patent application Ser. No. 13/090,127. Furthermore, the optical elements may be completely or partially coated with different types of coatings to achieve different effects, such as anti-reflective coatings, see U.S. Pat. No. 8,031,224, chromium-based reflective coatings, see U.S. Pat. No. 9,181,616, and other coatings, such as polymeric substrates, described in U.S. patent application Ser. No. 14/936,024 and U.S. patent application Ser. No. 15/124,310. Preferably the optical elements consist of a scratch-resistant material, as described for example in the German patent application No. 102016108247.3. The optical elements may have decoupling structures at certain points on the optical elements and an optical film, such as an extrusion film, and a shaped coating may be applied as described in German patent application No 102011103200. A coating for spectral and stress control is described in the U.S. patent application Ser. No. 15/124,310. Various filters can be integrated into the optical elements, such as gray filters or polarization filters, which are described in the U.S. patent application Ser. No. 14/809,509. Electrochromic substrates, polymer electrolytes and other charge conducting media may be included for the optical elements based on the descriptions as disclosed in European Patent Application No. 08103179.1, European Patent No. 2202826, U.S. Pat. Nos. 7,999,992 and 8,537,451.

The camera module may also be equipped with light intensity control devices as described in U.S. patent application Ser. No. 14/809,509 and light level amplifiers as described in U.S. patent application Ser. No. 09/771,140.

The electrochromic substrates and devices used in European Patent Application No. 08103179.1, European Patent No. 2202826, U.S. Pat. Nos. 7,999,992 and 8,537,451 may also be used for this purpose, as may a transflector for transmitting or reflecting light on the basis of a corresponding input signal as described in German Patent Application No. 102016106126.3.

The camera module or a cover adapted to the camera module can be moved using various actuators, drives and/or a flexible path, as described for example in German application No. 102016108247.3 and U.S. patent application Ser. No. 15/281,780. Furthermore, the camera module can also include cleaning elements to clean the optical element pointing outwards and exposed to the environment. The cleaning element may, for example, contain wipers, brushes, lips, nozzles, fans and similar elements as described in European Patent Application No. 14165197.6, U.S. patent application Ser. No. 15/281,780, German Patent Application No. 102016108247.3, European Patent Application No. 13163677.1, European Patent Application No. 15173201.3 and European Patent No. 1673260. The cleaning devices are not limited in their composition and may include, for example, any fabrics, elastomers, sponges, brushes or combinations thereof. Special wiper elements comprising wiper arms, wiper blades, wipers, wiping fabrics and combinations thereof are described in European patent application No 14165197.6. For example, a wiper element can be controlled according to the procedure described in European Patent Application No. 130164250.6. A reservoir for holding a cleaning fluid as described in European patent application No. 14165197.6 may be attached to or integrated with the camera module to supply the cleaning fluid to the optical elements of the camera module.

Various methods may be used to detect dirt or other turbidity that may prevent or impair the functioning of the camera module as described in U.S. Pat. No. 8,395,514, European Patent No. 1328141, and U.S. Pat. No. 8,031,224. Light sources can also be incorporated or integrated into the camera module to increase the visibility of surrounding objects, measure distances and directions, and detect dirt, as described in U.S. Pat. No. 8,031,224, U.S. Patent Application No. 62/470,658, and U.S. patent application Ser. No. 09/771,140.

It is known to provide heating devices for such cameras or protective glasses. For this purpose, for example, heating foils are glued to the protective glass or laminated with it. Such a solution is costly to manufacture and, due to the low thermal mass of such a heating foil, has only a low heating capacity. Various heating media such as heating coils, heating devices integrated into the lens holder or bezel, or other heating elements can be used to prevent condensation and icing on the surface of optical elements, such as in German Patent Application No. 102016108247.3 and US Patent Application No. 62/470,658.

Waterproof seals against weather influences as well as against the influence of washing processes with detergents, solvents and high-pressure cleaners can be used on the housing of the camera module, as described for example in the U.S. patent application Ser. No. 13/090,127. Alternatively, the housing may be made of a body consisting of plastic and conductive material, the conductive material being distributed in the plastic material to form a conductive ground to enable a current source, preferably a DC voltage source, to connect to the body via at least two electrodes and to heat the body accordingly. A conductive path may be embedded in plastic parts of the camera module as described in European Patent No. 1328141 and U.S. Pat. No. 7,083, 311.

The camera module may include an energy collection system as described, for example, in European patent application No. 09171683.7. A fault detection system for electrical loads, as described in U.S. Pat. No. 8,487,633, can be used to detect failure of the camera module.

Various control means and analysis devices can be used, such as the calculation units described in the U.S. patent application Ser. No. 13/090,127, the German patent application No. 102016106126.3, the German patent application No. 102011053999, the European patent specification No. 2146325 and the U.S. Pat. No. 8,849,104. In addition, the HDR technology (High Dynamic Range) according to the U.S. patent application Ser. No. 14/830,40 can be used.

Various types of attachments can be used to attach the camera module to the vehicle or other components, such as the snap-on connector described in European Patent No. 2233360.

From US 2016/065 796 A1 a camera arrangement for a motor vehicle is known, in which a camera can be moved linearly along a motion axis from a rest position into an operating position. The camera can also be rotated around its axis of motion to allow different viewing directions of the camera.

US 2009/231 430 A1 describes a camera arrangement in which a sliding sleeve is provided to move the camera between a rest position and an operating position. The sliding sleeve can perform a linear movement, while the camera is pivoted on the sliding sleeve and can be swung out of a window opening perpendicular to the axis of movement of the sliding sleeve.

DE 10 2014 217 864 A1 concerns a motor vehicle camera which is at least partially mounted in a housing which is installed on or in a motor vehicle. There is at least one light source for illuminating at least part of the camera environment. The housing should be at least partially light-guiding, at least one illuminant being positioned in such a way that light can be coupled into the light-guiding part and coupled out in the direction of the part of the camera environment to be illuminated.

A vehicle known from DE 10 2008 012 033 has a camera for monitoring an environment, i.e. a rear traffic area. The camera can be moved between a retracted position and an extended position. It is completely covered with a pivoting upper flap and a pivoting lower flap in the retracted position.

From DE 10 2014 013 673 A1 a mount for folding rear lights is known. DE 10 2015 007 179 A1 describes an environmental detection device for a motor vehicle.

Movable camera equipment is also known from DE 10 2011 001 825 A1, DE 10 2006 039 192 A1, DE 10 2015 105 771 A1, DE 10 2009 015 610 A1, US 2015/0183380 A1 and US 2015/0360619 A1.

A vehicle with a car body structure and a video camera unit is known from the U.S. Pat. No. 9,403,491B2. The video camera unit comprises a basic element, a video camera, a video display and an image processor. The base element is fixed to one side of the vehicle. The video camera is mounted movably on the base for movement between a retracted position (rest position) adjacent to the side face and an extended position (operating position) away from the side face for acquiring a video image. The video display is arranged in a passenger compartment. The image processor is operatively coupled to the video camera and video display to process the video image acquired by the video camera and stream a video to the video display. The basic element of a embodiment may be attached to the inside of a mudguard in such a way that the distal end of the video camera is flush with the outside of the mudguard in the rest position. In another version, the video camera can be rotated.

DE 103 36 681 A1 relates to a motor vehicle with a device for detecting the surroundings, comprising a detection means and a means for analyzing the information given by the detection means to determine an object located in the surroundings, and with a lighting device which can be controlled via a control device as a function of the determination result in such a way that the determined object can be individually illuminated.

From DE 203 19 579U1, a lamp, in particular a brake lamp, with a housing and at least one lamp element is known, a camera being integrated in the housing. The camera is mounted on a pivoting ball joint mount.

A flasher lamp comprising: a lamp body; an outer cover forming a lamp chamber with the lamp body; a light source mounted in the lamp chamber; a light guide mounted in the lamp chamber and adapted to guide light emitted from the light source; and a camera mounted in the lamp chamber and provided with image acquisition means is known from DE 10 2016 200 183 A1. When the turn signal lamp is mounted on the vehicle surface, at least part of the light guide is formed in an area extending from the camera in a direction following a vehicle surface.

DE 10 2015 113 725 A1 concerns a camera module for a motor vehicle with a car body, the camera module comprising at least one camera unit with a housing and a drive unit for the camera unit, the camera unit being coupled to the drive unit and the camera unit being movable by the drive unit in at least two positions, in particular into an active position for the visual detection of the outside area and into an inactive position, and the car body has a section which is provided with an opening which is assigned to the camera module, and the opening being closable by the camera module in the inactive position of the camera unit.

The known movement mechanisms are usually very complex and require complex mechanics, which in turn increases the required installation space.

SUMMARY

In an aspect, an illumination and image acquisition unit for movable mounting on a vehicle body includes a movable section carrying an image pick-up section having at least one camera, an illumination section having at least one light source and an end section, at least the movable section between a rest and stow position, in which the end section completes a receptacle in the vehicle body, and at least one operating position, in which the camera can record video images and the light source can emit light, is movable in translator and rotational manner, the direction of translation extending at least partially substantially perpendicularly to an outer surface of the vehicle body and/or substantially horizontally, and the at least one light source being a component of a side boundary light, an ambient lighting, a signal or warning light, a flasher, a camper light, a laser display, a logo lamp, a floor light and/or a projector.

It is provided that the movable section is formed as an arm which can be moved translationally and rotationally, preferably via at least one first drive unit, and/or the image acquisition section can be moved translationally and/or rotationally relative to the illumination section, preferably via at least one second drive unit, and/or the camera in the image acquisition section is translationally and/or rotationally movable, preferably via at least one third drive unit, and/or the light source in the illumination section is translationally and/or rotationally movable, preferably via at least one fourth drive unit.

In another example, a movable camera housing is provided including the image acquisition section, the movable section and the end section and which is movable along a freeform curve, wherein the freeform curve, starting from the rest and stow position, has a first motion section comprising a first translational motion component and optionally a first rotational motion component and a second motion section comprising a second rotational motion component and optionally a second translational motion component.

It is also proposed that the camera and/or the light source and/or the first, second, third and/or fourth drive unit can be controlled by a control unit, depending on at least one vehicle parameter, at least one input from a driver and/or signals from at least one sensor unit.

Embodiments can further be characterized in that the first, second, third and/or fourth drive unit, the control unit and/or the sensor unit is/are arranged at least partially in the image acquisition section, the illumination section and/or the end section.

It is also proposed that a plurality of, in particular individually controllable light sources, are provided, and/or a plurality of, in particular individually light-feedable, light guides, with the at least one light source are provided, wherein preferably colour, intensity and/or switch-on times can be controlled.

It may also be provided that the end section is detachable or exchangeable as an end part and/or attached to the illumination section.

It may also be provided that the first rotational motion component is smaller than the second rotational motion component, and/or the first translational motion component is larger than the second translational motion component.

Furthermore, it may also be provided that the translational direction of the first and/or second translational motion component extends substantially perpendicularly to an outer surface of the outside cladding part and/or substantially horizontally.

In addition, it can also be provided that the rotation axis of the first and/or second rotational motion component is different from the direction of translation.

It may be advantageous to provide that the direction of rotation from the rest and stow position to the operating position is clockwise or anti-clockwise.

It is proposed that the image acquisition section is angled by more than 90° and less than 180°, in particular by about 100°, to the movable section, which is formed as a base part, and comprises the end section.

It is also proposed that the freeform curve is defined by a guide rail in the receptacle.

Furthermore, it is preferred that a further component is attachable attached in the camera housing, in addition to the light source, preferably in the form of a cleaning device and/or a heating device for the camera.

Embodiments can also be characterized in that an opening is provided in the vehicle body for the passage of at least the camera, and when the opening is passed by the camera from the first motion section into the second motion section starting from the rest and stowage position and/or from the second motion section into the first motion section starting from the operating position is changeable. In another aspect, a motor vehicle includes at least one illumination an image acquisition unit.

It may be provided that the first, second, third and/or fourth drive unit, the control unit and/or the sensor unit is/are arranged at least partially in the motor vehicle.

It is also suggested that the receptacle in the vehicle body comprises a first receptacle area complementary to the image acquisition section and a second receptacle area complementary to the illumination section.

It may also be provided that the movable section extends through an opening extending through the cladding of the vehicle body.

Finally, as invented, it is proposed that the end section is flush with the vehicle body in the rest and stow position of the movable section.

It is one aspect the illumination and image acquisition unit can provide a rear view device that can also operate outside the current legal regulations and which can nevertheless be approved for operation by means of exemptions or an adaptation of the legal regulations. Such a rear view device can be regarded as particularly inventive, as it provides a solution outside the pre-determined preknown framework.

The rear-view device can also be equipped with various illumination devices.

Various functions and devices can be built into and/or controlled by rear view devices, comprising in particular camera systems.

BRIEF DESCRIPTION OF THE DRAWINGS

Further advantages and features of the invention result from the following description of a preferred execution example with reference to the attached drawings.

DETAILED DESCRIPTION

Figure 1:
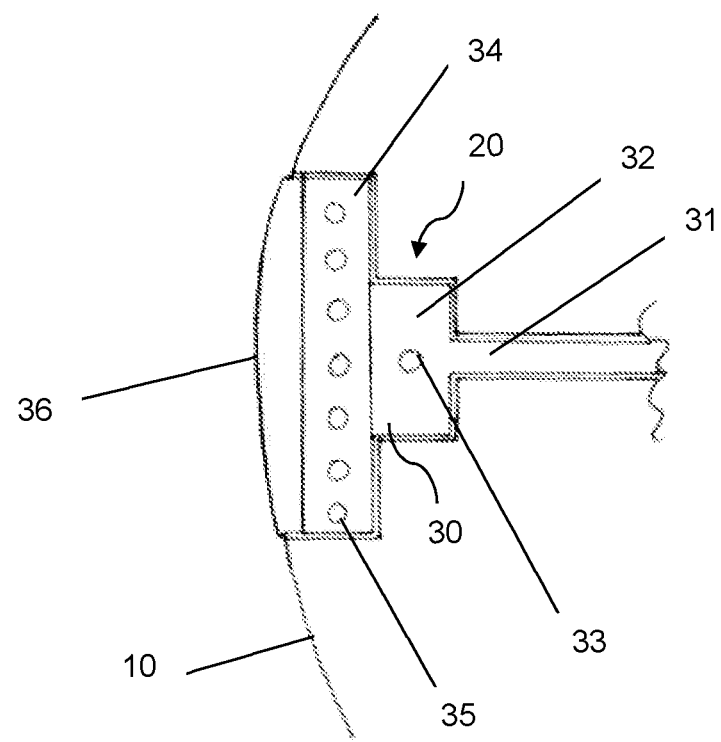
FIG. 1 illustrates a cross-sectional view of a first illumination and image acquisition unit in its rest and stow positions.
Figure 2:
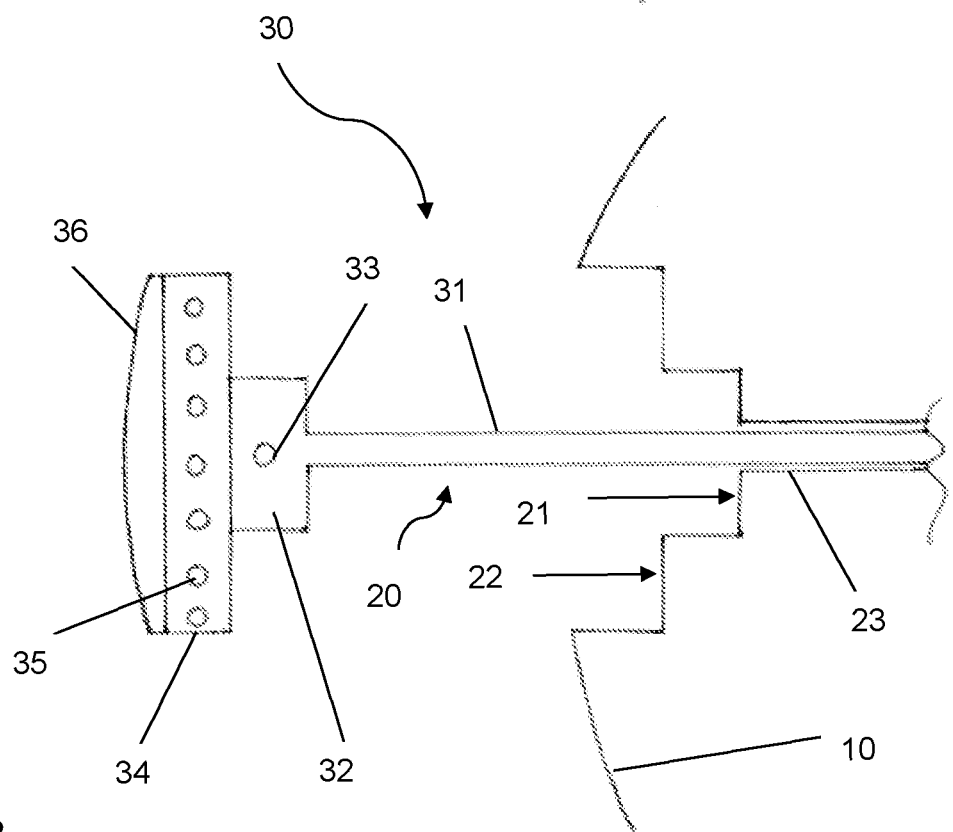
FIG. 2 illustrates the illumination and image acquisition unit of FIG. 1 in one operating position.

FIGS. 1 and 2 show a section of a vehicle body 10 with a shot 20 for a first illumination and image acquisition unit 30.

The illumination and image acquisition unit 30 comprises a movable arm 31 forming a movable section and carrying an image acquisition section in the form of an image acquisition part 32 with a video camera 33, an illumination section in the form of an illumination part 34 with a plurality of light sources 35 and a end section in the form of a end part 36. In the retracted position of the arm 31, as shown in FIG. 1 and hereinafter referred to as the rest and stow position, the end part 36 is flush with the outer surface of the vehicle body 10 by arranging the arm 31, the image acquisition part 32 and the illumination part 34 in the receptacle 20.

The illumination and image acquisition unit 30 can therefore be lowered into the receptacle 20 and thus into the body of the vehicle, so that it is not visible from the outside in the rest and stow position. For this purpose, exposure 20 comprises a first exposure area 21 for the image acquisition part 32 and a second exposure area for the lighting part 34. Arm 31 is movable in an opening 23 from the rest and stow position to an operating position as shown in FIG. 2.

Several operating positions can be provided in which the arm 31 extends the image acquisition part 32 and the illumination part 34 to different extents from the acquisition 20. For example, there may be a first operating position for driving in narrow alleys, a second operating position for normal driving and a third operating position for driving with a trailer.

Arm 31 performs a tanslatory movement to change position. The arm 31 can also be rotated. For this purpose, the arm is connected to a not shown control unit and a not shown drive unit.

The control unit can be located inside the vehicle, e.g. as part of the board computer. It can control the drive unit depending on vehicle parameters, driver inputs and/or signals from sensor units. If, for example, a trailer is coupled to the vehicle body 10, it can be automatically switched to the third operating position when the engine is started. Or if a narrow lane is detected by a radar sensor on the vehicle body 10, the system automatically switches to the first operating position.

The video camera 33 for acquiring video images and the light sources 35 for emitting light are also connected to the control unit. Furthermore, the control unit can also cause movement, in particular rotation of the video camera 33 in the image acquisition part 32; of the image acquisition part 32 relative to the illumination part 34; and/or of the light sources 35 in the lighting part 34.

At least one further drive unit which is not shown may be used for the image acquisition section 32 and/or the illumination part 34, which drive unit may be arranged in the image acquisition section 32 and/or the illumination part 34 but is connected to the control unit.

The video camera 33 can therefore be used for different views, such as a driving view, a rear view, a ground view or the like.

Light sources 35 can also fulfil a wide variety of functions, particularly depending on the position of the illumination part 34 relative to the vehicle. For example, a flashing function, a warning display or ambient illumination can be implemented via the illumination part 34. If, for example, arm 31 is extended to the third operating function, the illumination part 34 can supply a camper light. If, for example, the arm 31 is turned, the same spot can still be illuminated, e.g. on a floor, by switching the different light sources 35 on or off depending on the respective turning position. With a large number of individually controllable light sources 35, numerous lighting effects can be realized.

A rotatable unit consisting of the image acquisition part 32 and the lighting part 34 forces a rotationally symmetrical shape, while non-rotatable designs offer numerous design possibilities.

The end part can be detachably mounted to be easily replaceable in the event of damage and/or for design reasons. It can, for example, be provided with a logo, a message or the like.

The first inventive illumination and image acquisition unit opens up numerous application possibilities in a wide variety of motor vehicles, such as passenger cars, trucks, mobile homes, motorcycles and the like.

In the case of a second movable illumination and image acquisition unit, which is designated as 110 in total in FIGS. 3 to 6, only the camera arrangement for a motor vehicle can be seen, while other components, in particular light sources, are not shown for the sake of clarity. The camera arrangement comprises a camera housing 112 with a camera acquisition section 114 and a base section 116. In the camera acquisition section 114, which is angled at about 100° to the base section 116, a camera 118 is mounted.

Figure 5:
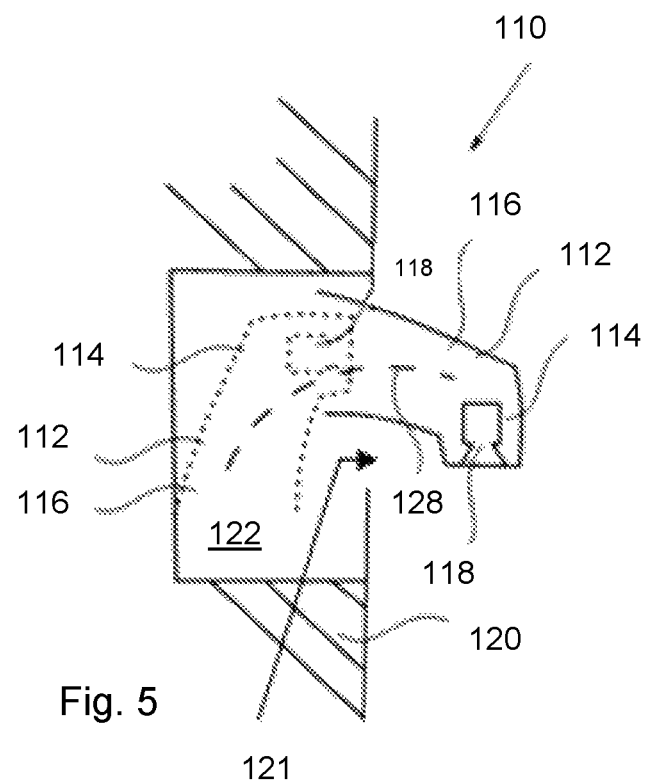
FIG. 5 illustrates the illumination and image acquisition unit according to FIG. 3 in schematic sectional view in the rest and stow position and the operating position.

The camera body 112 can be mounted in a receptacle 122 of an outside cladding part 120 of the motor vehicle. Receptacle 122 has an opening 121 for at least a part of the camera body 112 to pass through. From the rest and stow position shown dashed lines in FIG. 5, the camera body 112 can be swiveled through the opening 121 into an operating position in which the camera body 112 protrudes laterally from the outside cladding part 120, as shown in FIG. 5 by the solid line. The degree of protrusion depends on the desired field of view of the camera 118.

Figure 3:
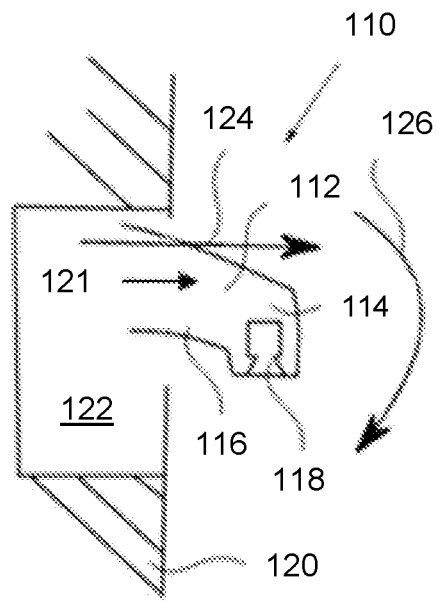
FIG. 3 illustrates a schematic cross-sectional view of a second illumination and image acquisition unit in its operating position.
Figure 4:
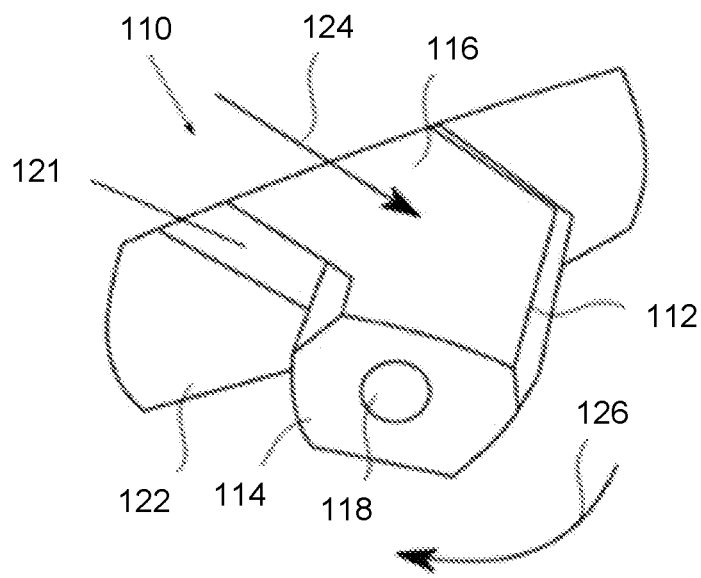
FIG. 4 illustrates the illumination and image acquisition unit according to FIG. 3 in schematic perspective representation.

The motion of the camera body 112 between the rest and stow position and the operating position comprises a superposition of a displacement along a translational direction characterized by an arrow 124 and substantially perpendicular to an outer surface of the outside cladding part 120 and a clockwise rotation as illustrated by the arrow 126 in FIGS. 3 and 4. This results in a movement along a freeform curve 128, as shown in FIG. 5. Freeform curves should be understood here in particular as curves which do not have a constant radius and which, in particular, have a continuous change in their tangent slope or curve radius.

Accordingly, the motion comprises a first motion section in which the displacement along arrow 124 predominates, while in a second motion section the rotation along arrow 126 predominates. Such a course of movement can be realized, for example, by an appropriate, not shown guide rail. Such a guide rail can easily be adapted to different conditions so that, for example, the same camera housing can be used in different motor vehicles with different geometry of the outside cladding part 120. It can also be used in different installation positions in the vehicle, for example as a side rear view camera or as a rear camera.

Figure 6:
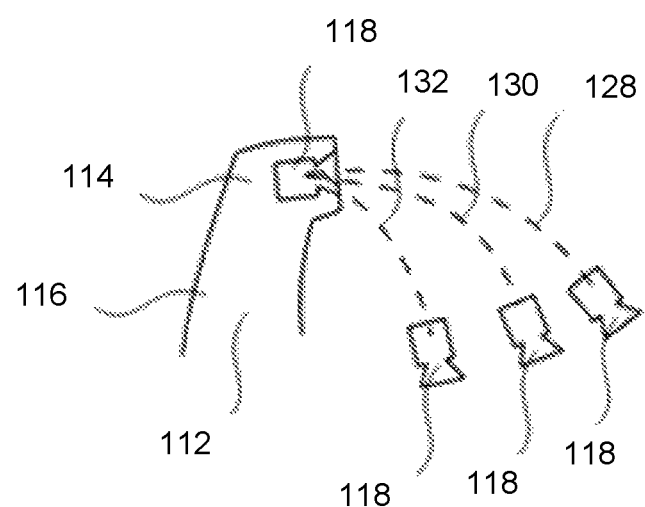
FIG. 6 illustrates the illumination and image acquisition unit according to FIG. 3 in schematic sectional view in different operating positions.

FIG. 6 shows examples of different possible freeform curves 128, 130, 132, each of which can be used in different mounting positions or with different component geometries. For the sake of clarity, only the camera 118 is shown in the operating position. Of course, the movement here also affects the entire camera housing 112.

It is also possible to realize different motion sequences from the same mounting position in the same vehicle. For example, the camera position can be adjusted depending on whether a trailer is coupled to the vehicle or not.

Figure 7:
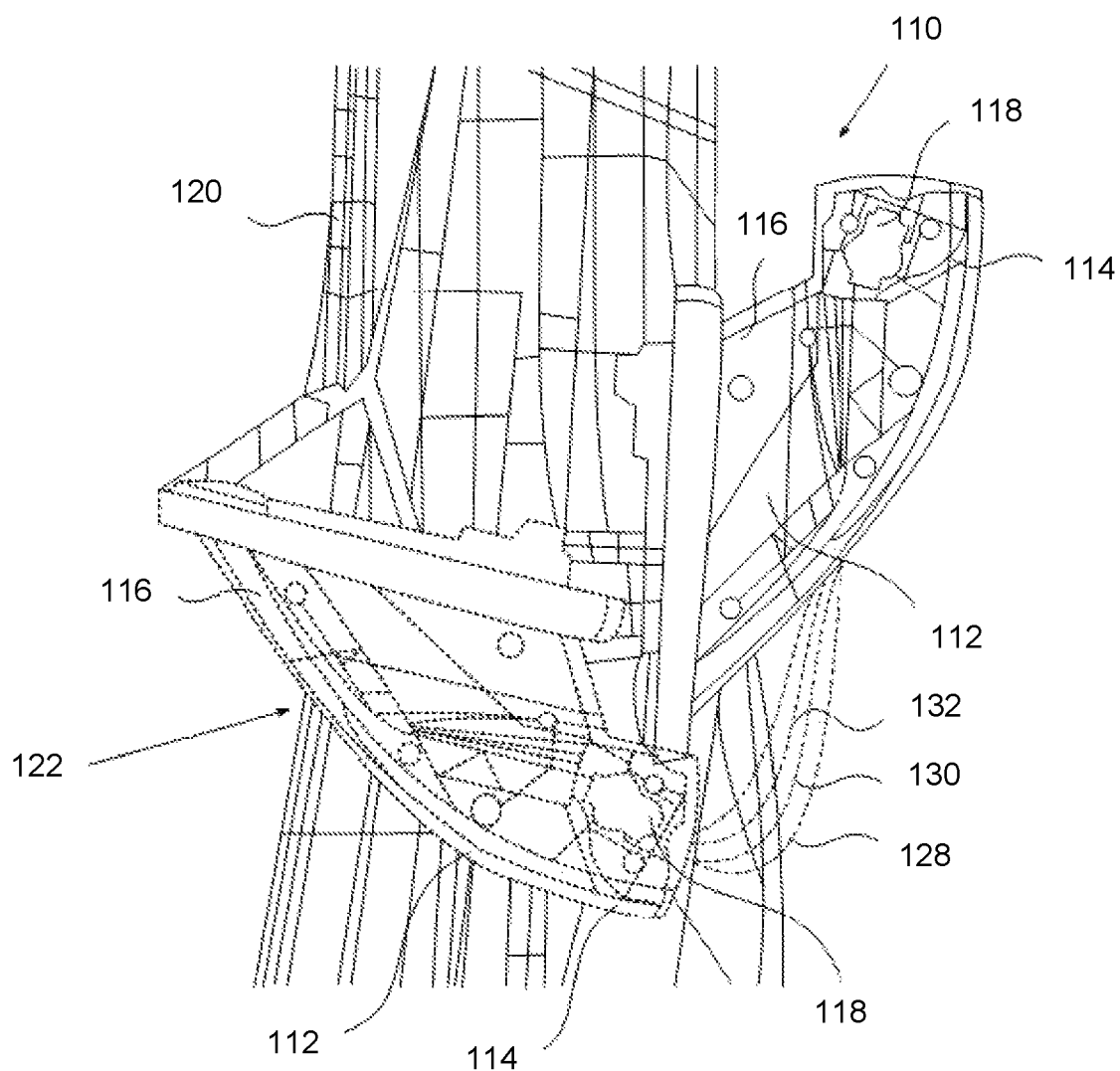
FIG. 7 illustrates a detailed view of a third example illumination and image capture unit in the rest and stow position and the operating position.
Figure 8:
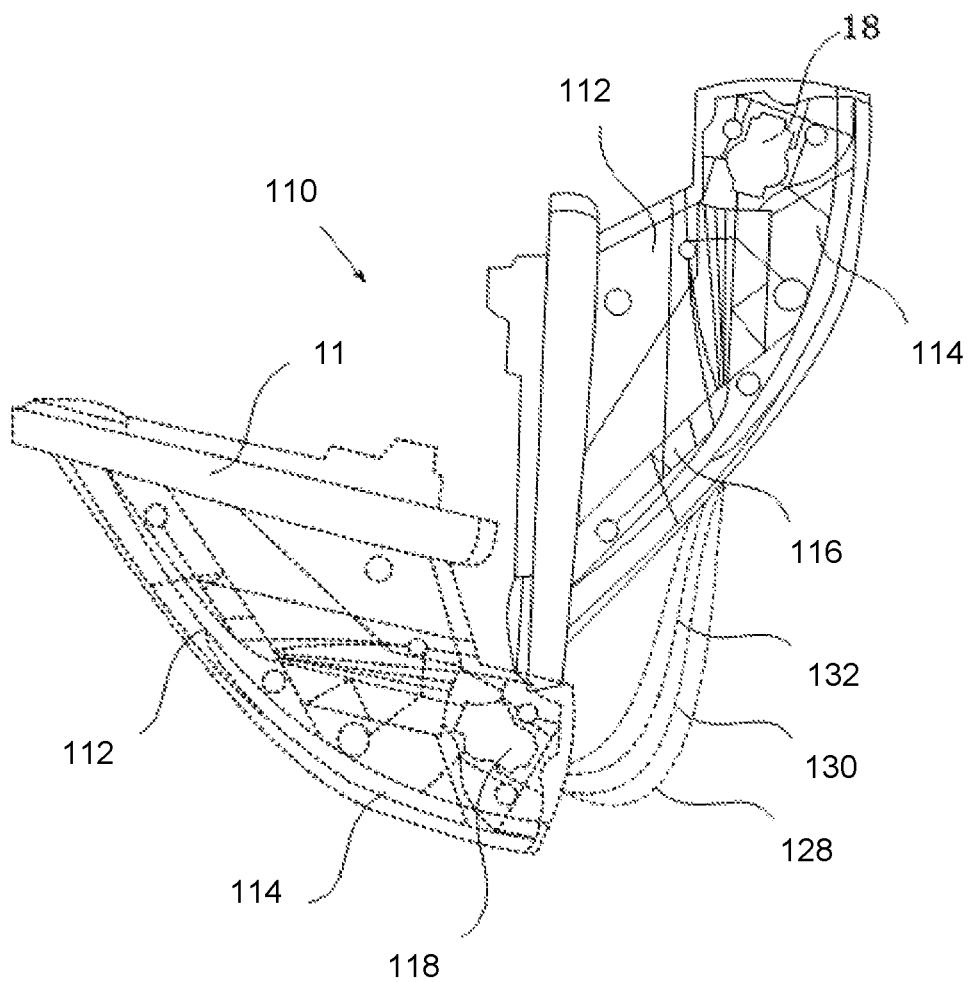
FIG. 8 illustrates a detailed view of a camera housing of the illumination and image acquisition unit according to FIG. 7 in the rest and stow position and the operating position.

FIGS. 7 and 8 show an example embodiment of a camera arrangement 110 of a third illumination and image acquisition unit. The figures show the camera body 112 in the rest and stow position with dashed lines and solid lines in the operating position. The outside cladding part 120 also shown in FIG. 7 is omitted to illustrate the movement between the positions in FIG. 8.

Figure 9:
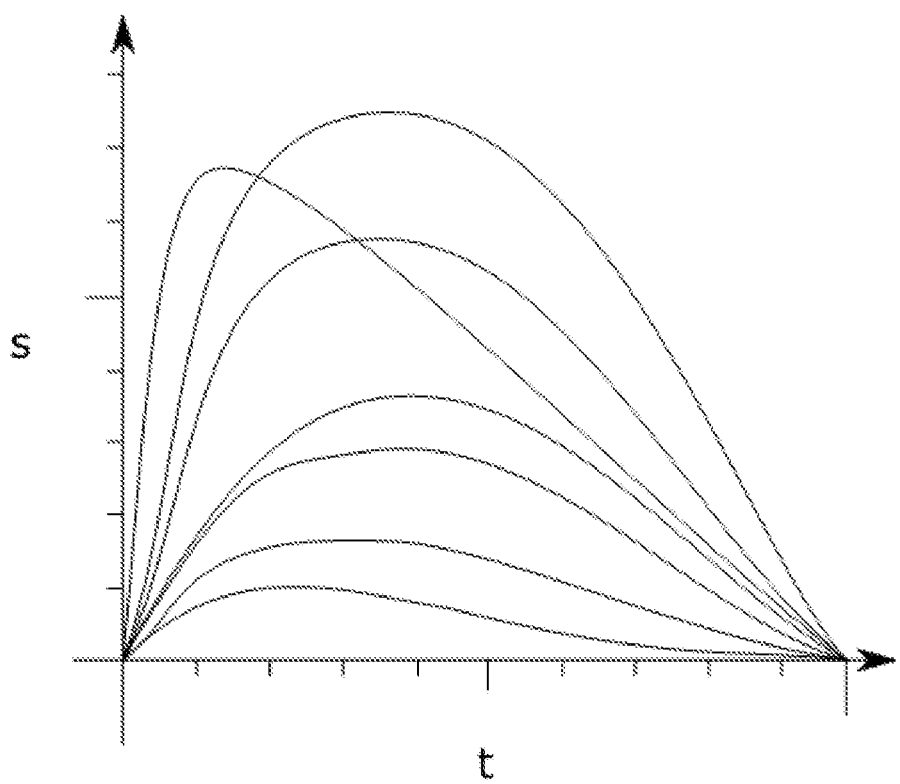
FIG. 9 illustrates a schematic graph illustrating the different swivel paths of a design example of an inventive illumination and image acquisition unit between its rest and stow position and its operating position.

FIG. 9 shows a schematic graphic representation of different distance-time courses for the movement between the rest and stow position and the operating position of the camera housing 112. This is an alternative representation of the freeform curves 128, 130, 132 shown in FIGS. 5 and 6. In general, these courses are reversible, i.e. when moving from the operating position to the rest and stow position, the courses or freeform curves 128, 130, 132 are traversed in the opposite direction. Alternatively, it is also possible for the movement from the rest and stow position to the operating position to traverse a different freeform curve than the movement from the operating position to the rest and stow position.

All in all, this creates a camera arrangement of 110 that is particularly compact, requires little space for its movement and can be easily adapted to different component geometries.

The features of the invention disclosed in the above description and in the claims and drawings may be essential, either individually or in any combination, for the realization of the invention in its various embodiments.

REFERENCE LIST

10 Vehicle body
20 receptacle
21 First acquisition area
22 Second acquisition area
23 Opening
30 Illumnination and image acquisition unit
31 Arm
32 Image acquistion part
33 Video camera
34 Illumination part
35 Light source
36 end part
110 Camera arrangement
112 Camera housing
114 Camera acquisition section
116 Base section
118 Camera
120 Outside cladding part
121 Opening
122 Receptacle
124 Direction of translation
126 Direction of rotation
128 Freeform curve
130 Freeform curve
132 Freeform curve

What is claimed is:

1. An illumination and image acquisition unit for movably mounting on a vehicle body, comprising
a movable section carrying an image acquisition section having at least one camera, an illumination section having at least one light source, and an end section,
wherein the movable section is movable between a rest and stow position in which the end section completes a receptacle in the vehicle body and at least one operating position in which the camera can record video images and the light source can emit light,
wherein the movable section is movable in a translational and rotational manner, the direction of translation extending at least one of at least partially substantially perpendicularly or substantially horizontally to an outer surface of the vehicle body, and the at least one light source being a component of a side boundary light, an ambient lighting, a signal or warning light, a flasher, a camper light, a laser display, a logo lamp, a floor light or a projector,
wherein the movable section is formed as an arm which is translationally and rotationally movable,
wherein the image acquisition section is at least one of translationally or rotationally movable relative to the illumination section,
wherein the camera in the image acquisition section is at least one of translationally and rotationally movable,
wherein the light source in the illumination section is at least one of translationally and rotationally movable,
wherein a movable camera housing is provided comprising the image acquisition section, the movable section and the end section and is movable along an arcuate curve, wherein the arcuate curve starting from the rest and stow position has a first motion section comprising a first translational motion component and optionally a first rotational motion component, and a second motion section comprising a second rotational motion component and optionally a second translational motion component.

2. The illumination and image acquisition unit according to claim 1, wherein at least one of the camera, the light source, and at least one drive unit can be controlled by a control unit depending on one or more of at least one vehicle parameter, at least one input from a driver, or signals from at least one sensor unit.

3. The illumination and image acquisition unit according to claim 1, wherein one or more of at least one drive unit, the control unit, or the sensor unit is arranged at least partially in one or more of the image acquisition section, the illumination section, or the end section.

4. The illumination and image acquisition unit according to claim 1, further comprising at least one of
a plurality of individually controllable light sources, or
a plurality of individually light-feedable light guides with the at least one light source.

5. The illumination and image acquisition unit according to claim 1, wherein the end section is at least one of detachable or exchangeable as an end part or attached to the illumination section.

6. The illumination and image acquisition unit according to claim 1, wherein at least one of
the first rotational motion component is smaller than the second rotational motion component, or
the first translational motion component is greater than the second translational motion component.

7. The illumination and image acquisition unit according to claim 1, wherein the translational direction of at least one of the first or second translational motion component extends at least one of substantially perpendicularly or substantially horizontally to an outer surface of an outside cladding part.

8. The illumination and image acquisition unit according to claim 1, wherein the rotation axis of at least one of the first and the second rotational motion component is different from the direction of translation.

9. The illumination and image acquisition unit according to claim 1, wherein the direction of rotation from the rest and stow position to the operating position is clockwise or anti-clockwise.

10. The illumination and image acquisition unit according to claim 1, wherein the image acquisition section is angled by more than 90° and less than 180° to the movable section which is formed as a base part and comprises the end section.

11. The illumination and image acquisition unit according to claim 1, wherein the arcuate curve is defined by a guide rail in the receptacle.

12. The illumination and image acquisition unit according to claim 1, wherein a further component is attachable or attached in the camera body in addition to the light source.

13. The illumination and image acquisition unit according to claim 1, wherein an opening is provided in the vehicle body for the passage of at least the camera, and when the opening is passed by the camera from the first motion section into the second motion section starting from the rest and stowage position or from the second motion section into the first motion section starting from the operating position is changeable.

14. A motor vehicle having at least one illumination and image acquisition unit according to claim 1.

15. The motor vehicle according to claim 14, wherein one or more of the at least one drive unit, the control unit or the sensor unit is arranged at least partially in the motor vehicle.

16. The motor vehicle according to claim 14, wherein the receptacle in the vehicle body comprises a first receptacle area complementary to the image acquisition section and a second receptacle area complementary to the illumination section.

17. The motor vehicle according to claim 14, wherein the movable section extends through an opening extending through the outside cladding part of the vehicle body.

18. The motor vehicle according claim 14, wherein the end section is flush with the vehicle body in the rest and stow position of the movable section.

* * * * *